United States Patent [19]

Lindstrom et al.

[11] Patent Number: 4,713,375
[45] Date of Patent: Dec. 15, 1987

[54] VISCOELASTIC SOLUTION

[76] Inventors: Richard L. Lindstrom, 1065 W. Ferndale Rd., Wayzata, Minn. 55391; Debra L. Skelnik, Box 344, Rte. 5, Cambridge, Minn. 55008

[21] Appl. No.: 761,406

[22] Filed: Aug. 1, 1985

[51] Int. Cl.$^4$ ............................................. A61K 31/70
[52] U.S. Cl. ........................................ 514/57; 514/54
[58] Field of Search ................................... 514/54, 57

[56] References Cited

U.S. PATENT DOCUMENTS 4,436,730 3/1984 Ellis et al. .............................. 514/57
4,486,416 12/1984 Soll et al. .............................. 514/54

OTHER PUBLICATIONS

Kaufman et al., *American Journal of Opthalmology*, 1984, pp. 112–114.
Lindstrom et al., *Chemical Abstracts*, vol. 103, 1985, No. 156864r.

*Primary Examiner*—J. R. Brown
*Assistant Examiner*—Elli Peselel
*Attorney, Agent, or Firm*—Hugh D. Jaeger

[57] ABSTRACT

Viscoelastic solution including a buffered solution, 1–8% cellulose gum and 1–8% chondroitin sulfate, pH adjusted to 7.2–7.6 at a osmolality between 200–400 MOSM. The buffered solution can be HEPES buffered minimum essential media (MEM), phosphate buffer system (PBS), balanced salt solution, or TC199.

1 Claim, No Drawings

VISCOELASTIC SOLUTION

BACKGROUND OF THE INVENTION

1. Field of the Invention

The present invention pertains to a viscoelastic solution which is used during eye surgery to protect cells from mechanical trauma, to maintain or create tissue spaces, to ensure separation and lubrication of tissue surfaces, to permit the manipulation of tissues without mechanical damage, and to prevent and control movement and activities of certain cells.

2. Description of the Prior Art

There have been numerous prior art solutions such as Healon, a non-inflammatory, high molecular weight fraction of sodium hyaluronate.

The present invention provides a viscoelastic solution which includes good coating properties and natural occurring bicompatible polymer.

SUMMARY OF THE INVENTION

The general purpose of the present invention is a viscoelastic solution which provides a buffered pH neutral solution as a base, and includes the attributes of the combination of chondroitin sulfate and cellulose gum.

One significant aspect and feature of the present invention is a viscoelastic solution which provides better viscosity including the viscoe properties of the cellulose and the lubricating of the chondroitin sulfate.

Another significant aspect and feature of the present invention is providing a buffered pH neutral solution as a base for the viscoelastic solution.

A further significant aspect and feature of the present invention is a viscoelastic solution which provides cell protection and cell coating during eye surgery. The solution provides maintenance of the tissue space, the chondroitin sulfate lubricates the tissue while the cellulose gum provides tissue manipulation.

DESCRIPTION OF THE PREFERRED EMBODIMENTS

Viscoelastic solution includes a buffered solution, 1–8% cellulose gum and 1–8% chondroitin sulfate pH adjusted to 7.2–7.6% at osmolality between 200–400 MOSM. The buffered solution can be selected from HEPES buffered minimum essential media (MEM), phosphate buffer system (PBS), balanced salt solution, or TC 199 from GIBCO. The cellulose gum can be substituted with either carboxy-propylmethyl cellulose or hydroxy-propyl methyl cellulose. Preferably, the cellulose gum can be at 4 percent while the chondroitin sulfate can be at 2–4 percent volume. The solution can be introduced into the eye during surgery to protect cells from trauma and to provide lubrication during the procedure.

We claim:

1. A method of protecting cells and cell coatings during eye surgery, which method comprises bringing the cells or cell coatings into contact with a viscoelastic composition for use in ophthalmic surgery, which composition comprises effective amounts of:
    a. a buffered solution which is at least one of a balanced salt solution, a buffered minimum essential medium, a phosphate buffered system, or TC 199;
    b. at least one of a cellulose gum, carboxypropyl methyl cellulose or hydroxypropyl methyl cellulose; and,
    c. chondroitin sulfate, the composition having a pH of 7.2–7.6 and an osmolality of 200–400 MOSM.

* * * * *